(12) United States Patent
Butz

(10) Patent No.: US 6,416,105 B2
(45) Date of Patent: Jul. 9, 2002

(54) ROLL-UP CARGO-SPACE COVER FOR MOTOR VEHICLE

(75) Inventor: Peter Butz, Hamburg (DE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 09/812,227

(22) Filed: Mar. 19, 2001

(51) Int. Cl.[7] .................................................. B60R 7/02
(52) U.S. Cl. .................................................. 296/37.16
(58) Field of Search .............................. 296/37.16, 98, 296/136; 160/294, 293.1, 290.1, 305

(56) References Cited

U.S. PATENT DOCUMENTS

| | | | | |
|---|---|---|---|---|
| 4,220,367 A | * | 9/1980 | Gale et al. ............... | 296/37.16 |
| 4,502,674 A | * | 3/1985 | White et al. ............. | 296/37.16 |
| 4,671,557 A | * | 6/1987 | Lemp ....................... | 296/37.16 |
| 5,584,523 A | * | 12/1996 | Kawaguchi .............. | 296/37.16 |

FOREIGN PATENT DOCUMENTS

| | | |
|---|---|---|
| DE | 40 40 038 | 6/1991 |
| DE | 195 37 768 | 11/1996 |

\* cited by examiner

*Primary Examiner*—Joseph D. Pape
(74) *Attorney, Agent, or Firm*—Herbert Dubno; Andrew Wilford

(57) ABSTRACT

A cover has a roll-up housing mounted in a motor vehicle at a front end of its cargo space, a sheet retractable against spring force out of the housing and having a rear edge, and a stiff end board projecting generally a full width of the sheet at the rear edge thereof and having a front edge juxtaposed with the sheet rear edge. A thick edge bar is fixed to one of the edges and the other of the edges is releasably secured to this edge bar.

15 Claims, 4 Drawing Sheets

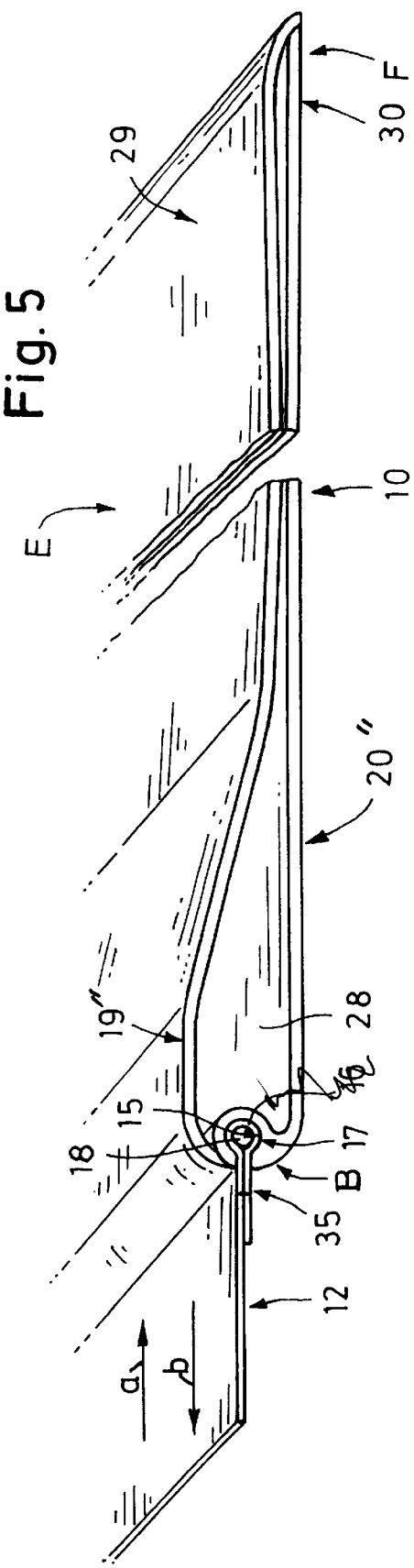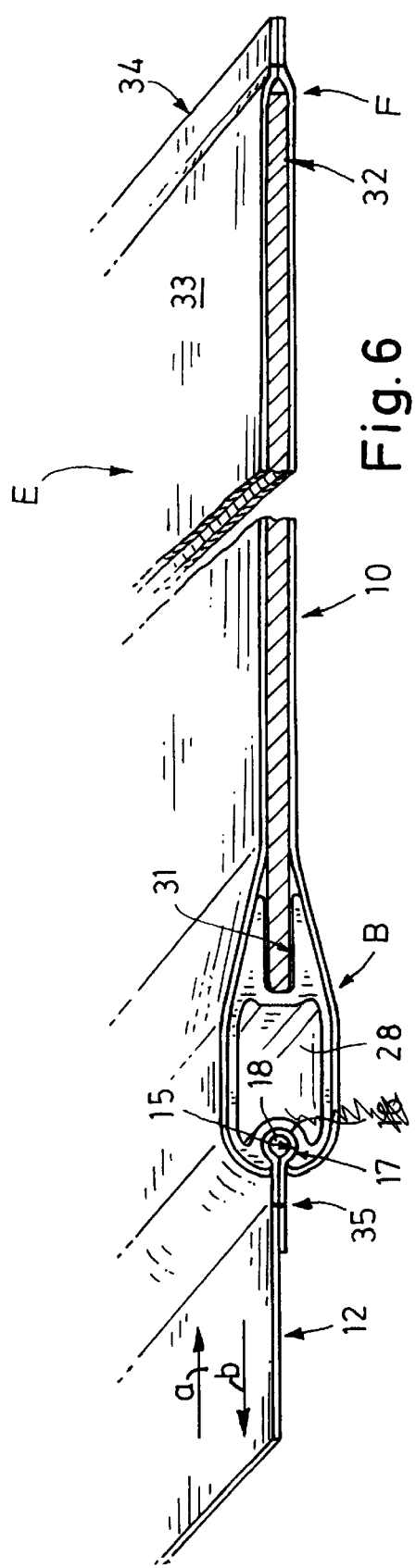

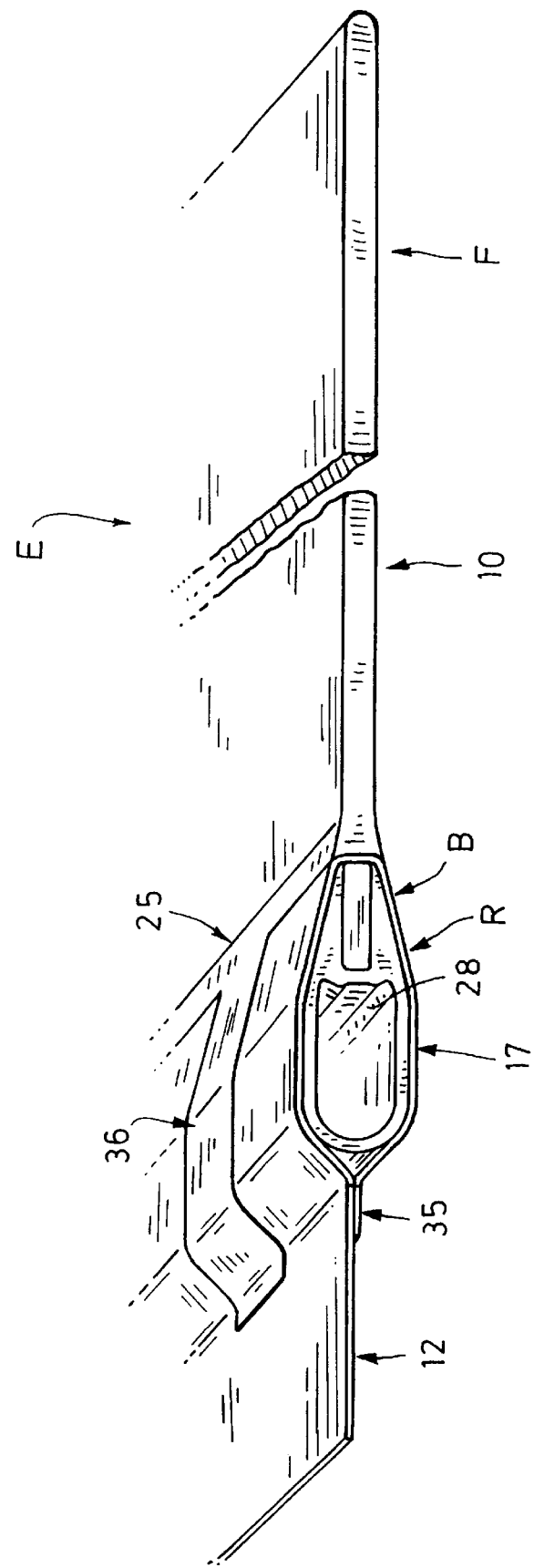

ROLL-UP CARGO-SPACE COVER FOR MOTOR VEHICLE

FIELD OF THE INVENTION

The present invention relates to a motor-vehicle cargo-space cover. More particularly this invention concerns such a cover that can be unrolled like a window shade to cover cargo in the space behind the seats of a station wagon or van.

BACKGROUND OF THE INVENTION

In a station wagon, for instance, it is known to mount a roll-up housing at a front end of a cargo space behind the rear seats, either securing the housing to the seats or to the walls of the vehicle. A cover sheet is wound up in this housing on a spring-loaded shaft so that it can be pulled from it. Typically the sheet has a rear edge provided with a stiffening rod whose ends can be fitted to seats at the rear end of the cargo space, leaving the cover stretched tautly above the cargo on the floor of the cargo space.

As described in German patent document 4,040,038 of E. Allershausen et al and German patent 195 37 768 of S. vanLieshout et al, these systems are fairly complex. A so-called end board is provided at the rear sheet edge, and has hand holes so a user standing at the rear of the vehicle can easily manipulate the cover and fit its pins into their vehicle-mounted seats. In general the known systems of securing this end board to the sheet is clumsy and often ineffective.

OBJECTS OF THE INVENTION

It is therefore an object of the present invention to provide an improved motor-vehicle cargo-space cover.

Another object is the provision of such an improved motor-vehicle cargo-space cover which overcomes the above-given disadvantages, that is whose end board is solidly mounted in an arrangement that is both robust and simple.

SUMMARY OF THE INVENTION

A cover according to the invention has a roll-up housing mounted in a motor vehicle at a front end of its cargo space, a sheet retractable against spring force out of the housing and having a rear edge, and a stiff end board projecting generally a full width of the sheet at the rear edge thereof and having a front edge juxtaposed with the sheet rear edge. A thick edge bar is fixed to one of the edges and the other of the edges is releasably secured to this edge bar.

Thus the end board according to the invention is a separate part and does not need to be painstakingly constructed with the cover sheet. Instead the end board is mounted at the rear edge of the cover sheet by means of the edge bar in accordance with the invention.

The edge bar according to the invention is formed with a forwardly open groove having a wide base and a narrow throat and the sheet rear edge is enlarged and complementarily received in the groove. The edge bar can in this case be formed as a single unitary piece. It can even be formed unitarily with the stiff end board. The pins can be unitarily formed with the edge bar.

The sheet rear edge according to the invention is formed as a loop holding a stiff rod. This rod has projecting ends that can form the pins.

Alternately the edge bar is formed with a transversely throughgoing passage and the cover has according to the invention a rod extending through the passage and having ends projecting therefrom and forming the pins.

The edge bar according to the invention is formed as a pair of elongated parts. Screws secure the parts together. One of the parts can be formed with a groove extending transversely and open toward the other part and the other part with a ridge fitting into the groove. The sheet rear edge is pinched between the ridge and groove. In another system the end-board front edge is widened and the two ports formed a wide-base groove in which the widened end-board front edge is gripped.

The two parts of the thick edge bar in accordance with the invention can be unitarily formed with respective flat rearward extensions that are secured together and form the end board. A decorative flexible overlay sheet surrounds the end board and edge bar. More particularly the edge bar is formed with a rearwardly open groove in which the end-board front edge is seated. The overlay sheet engages rearward around the end board and pressing its forward into the groove. Alternately the end-board front edge is provided with gripper clips engaged around the edge bar and constituting the securing means.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 3, 4, and 5 are views like FIG. 2 of further cargo covers according to the invention; and FIGS. 6 and 7 are perspective side views of two more cargo covers in accordance with the invention.

SPECIFIC DESCRIPTION

Figure 1:
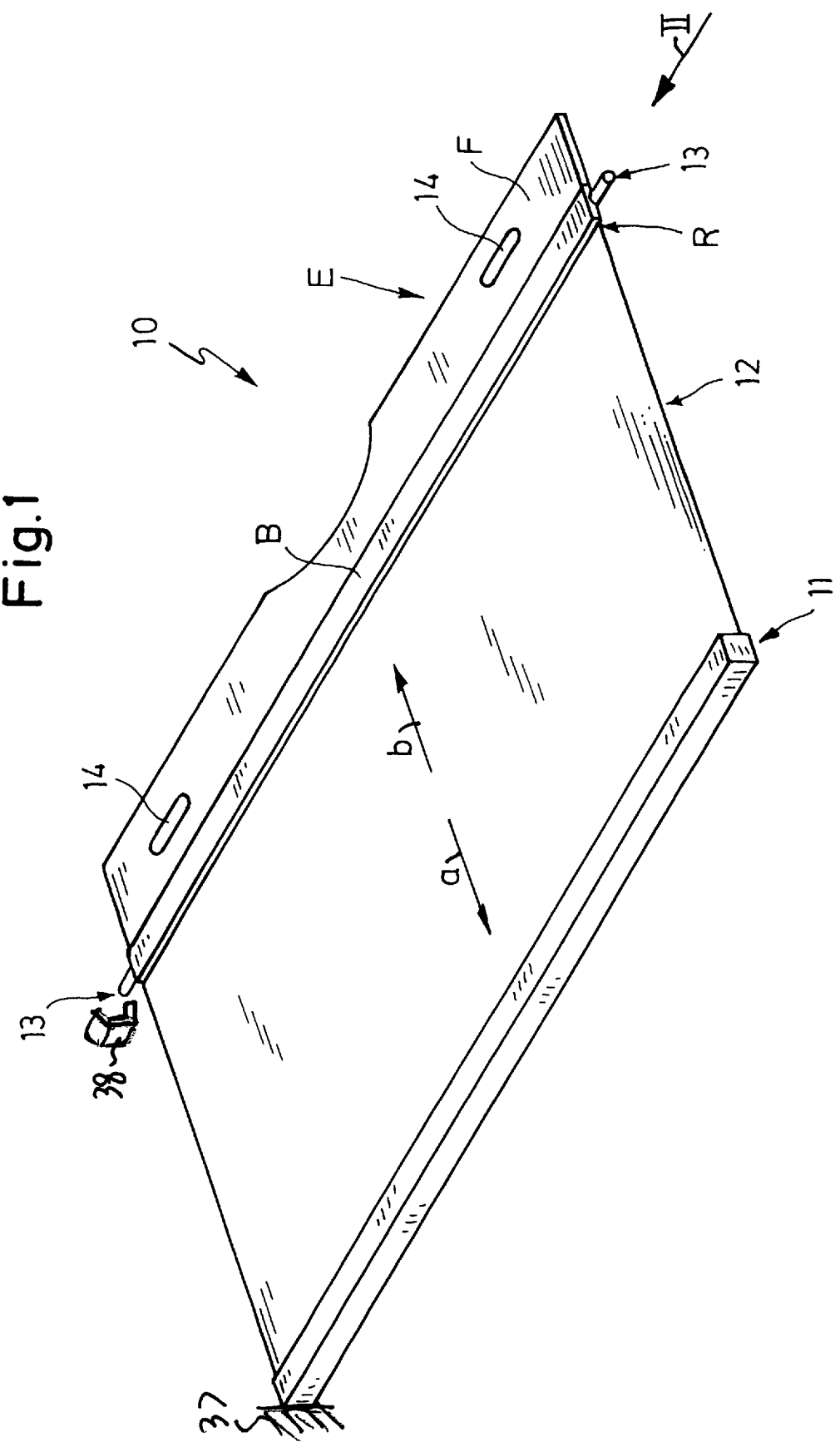
FIG. 1 is a partly schematic perspective view of a motor-vehicle cargo-space cover according to the invention.
Figure 2:
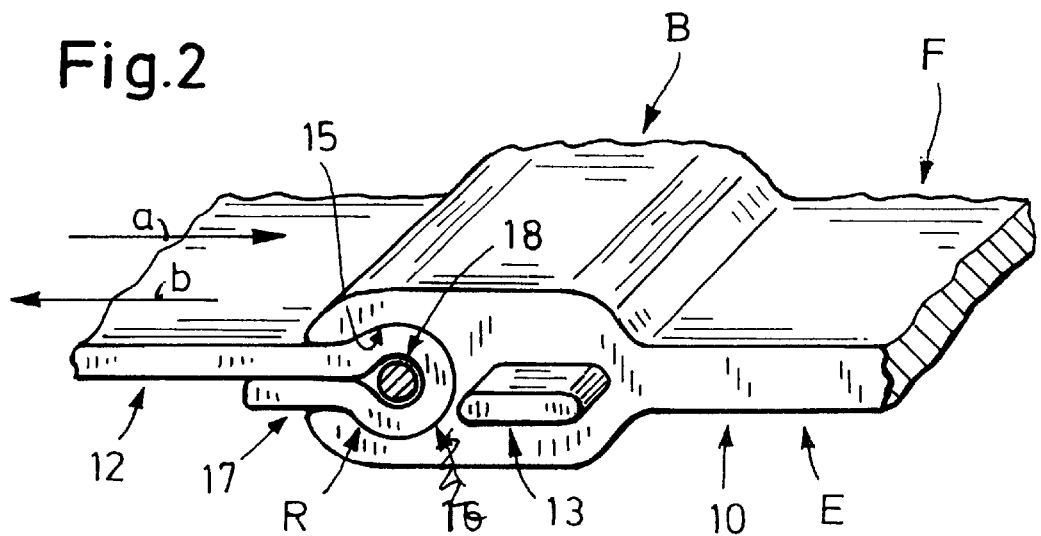
FIG. 2 is a large-scale side view taken in the direction of arrow II of FIG. 1.

As seen in FIGS. 1 and 2 a cargo cover 10 has a housing 11 normally fixed in a vehicle body illustrated schematically at 37 and provided internally with wind-up mechanism holding a front edge of a flexible sheet 12 that is pulled by spring force in direction a back into the housing 11 and that can be pulled in direction b opposite the spring force out of the housing 11. The housing 11 is normally mounted above the cargo-space floor on the vehicle body 37 or on the backs of the vehicle's rear seats so that when the sheet 12 is extended it covers cargo on this floor behind the seats.

The sheet 12 has a rear edge R anchored in a mounting edge bar B of a rigid and planar board E having a wide flat part F. The edge R is provided with two oppositely projecting pins 13 that are intended to be fitted to seats 38 fixed in the vehicle 37 and serving to hold the edge R against movement back in the windup direction a. The seats 38 are formed at the rear end of the cargo compartment well above the floor thereof. Hand holes 14 are formed in the flat part F of the board E so that a person standing at an open rear door of the vehicle can pull out the sheet 12 and hook the pins 13 in the seats 38.

FIG. 2 shows how the board E is unitarily formed of molded plastic both with the flat part F and the thick edge bar B. This bar B has a forwardly open groove 15 that is narrow at its throat to capture the edge R. To this end the edge R is formed as loop 17 surrounding a rod 18 that also serves to stiffen the edge R. In this case the thick edge bar B is unitarily formed with the pair of oppositely outwardly projecting pins 13. Alternately the ends of the rod 18 can project from the pocket 17 and form the pins 13. To separate the sheet 12 from the board E and bar B, the edge R must be slipped transversely out of the groove 15.

Figure 3:
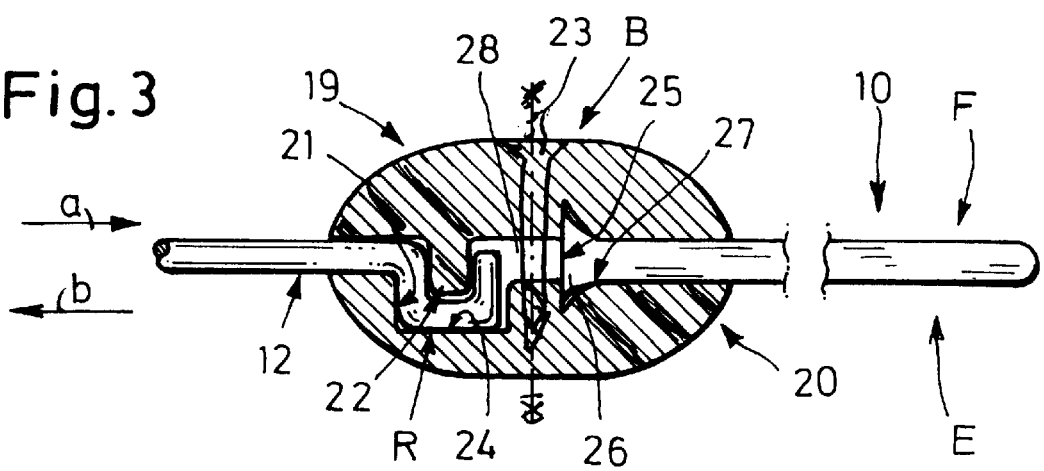

In FIG. 3 the thick edge bar B is a separate from the flat part F and is formed by a pair of molded-plastic parts 19 and 20 formed respectively with a transverse ridge 22 and groove 24 for pinching the edge R of the sheet 12. The flat part F has a front edge 25 widened at 26 and received in a widened groove 27 formed between the parts 19 and 20. Screws 23 secure the parts 19 and 20 together to clamp the rear sheet edge R and the front stiff-part edge 25.

Figure 4:
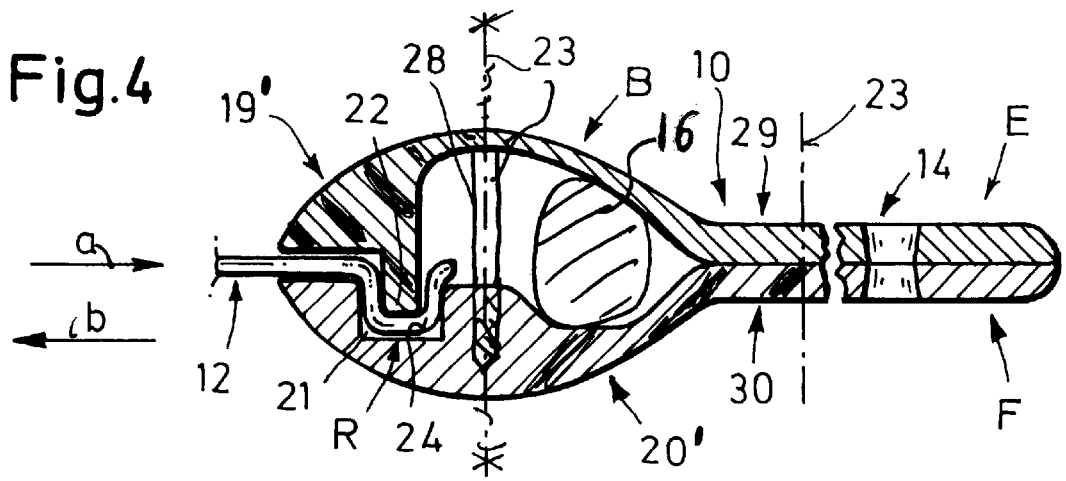

FIG. 4 shows an arrangement. similar to that of FIG. 3 but that is formed of two parts 19' and 20' that together form a transversely throughgoing passage 28 in which a rod 16 is gripped. Projecting outer ends of this rod 16 form the pins 13. Here the parts 19' and 20' are formed with rigid rearward extensions 29 and 30 that together form the stiff part F which, therefore, is unitary with the edge bar B. The two extensions 19 and 30 are welded together and formed with holes forming the hand holes 14. In this embodiment it would be possible to make the two extensions 29 and 30 actually a single piece, in which case the upper part 19' would be elastically deformed away from the part 20' to fit the edge R to it.

In FIG. 5 two parts 19" and 20" similar to those of FIG. 4 form a wide-base groove 15 for the sheet rear edge which has a loop 17 secured by stitching 35.

The arrangement of FIG. 6 has a one-piece edge bar B formed with a groove 31 in which is set the rear edge of a stiff plate 32 forming the stiff part F. A pair of textile cover sheets 33 have front ends secured in the groove 15 and rear ends welded together at 34 to cover the plate 32 and retain it in the groove 31, while providing a matching decorator touch to the cover 10.

In FIG. 7 the stiff part F is formed at its front edge 25 with forwardly projecting gripper tabs 36 that engage above and below the edge portion B which is surrounded by the loop 17 of the sheet 12. Thus here the stiffened edge bar B is actually mounted on the rear edge R of the sheet 12 and is subsequently attached by the clips or grippers 36 to the board E.

I claim:

1. In a motor vehicle having a cargo space, a cover comprising:
   a roll-up housing mounted in the vehicle at a front end of the space;
   a sheet retractable against spring force out of the housing and having a rear edge;
   a stiff end board projecting generally a full width of the sheet at the rear edge thereof and having a front edge juxtaposed with the sheet rear edge;
   a thick edge bar fixed to the board front edge; and
   means releasably securing the sheet rear edge to the edge bar.

2. The motor-vehicle cargo-space cover defined in claim 1 wherein the edge bar is formed with a forwardly open groove having a wide base and a narrow throat and the sheet rear edge is enlarged and complementarily received in the groove.

3. The motor-vehicle cargo-space cover defined in claim 2 wherein the edge bar is formed as a single unitary piece.

4. The motor-vehicle cargo-space cover defined in claim 3 wherein the edge bar is formed unitarily with the stiff end board.

5. The motor-vehicle cargo-space cover defined in claim 2 wherein the sheet rear edge is formed as a loop holding a stiff rod.

6. The motor-vehicle cargo-space cover defined in claim 5 wherein the rod has projecting ends forming pins.

7. The motor-vehicle cargo-spaced cover defined in claim 2 wherein the edge bar is unitarily formed with outwardly projecting pins.

8. The motor-vehicle cargo-spaced cover defined in claim 1 wherein the edge bar is formed with a transversely throughgoing passage, the cover further comprising
   a rod extending through the passage and having ends projecting therefrom and forming outwardly projecting pins.

9. The motor-vehicle cargo-space cover defined in claim 1 wherein the edge bar is formed as a pair of elongated parts between which the sheet rear edge is engaged, the means including screws securing the parts together.

10. The motor-vehicle cargo-space cover defined in claim 9 wherein one of the parts is formed with a groove extending transversely and open toward the other part and the other part is formed with a ridge fitting into the groove, the sheet rear edge being pinched between the ridge and groove.

11. The motor-vehicle cargo-space cover defined in claim 9 wherein the two parts are unitarily formed with respective flat rearward extensions that are secured together and form the end board.

12. The motor-vehicle cargo-space cover defined in claim 1 wherein the edge bar is formed as a pair of elongated parts between which the sheet rear edge is engaged, the end-board front edge is widened, and the two parts form a wide-base groove in which the widened end-board front edge is gripped.

13. The motor-vehicle cargo-space cover defined in claim 1, further comprising:
   a decorative flexible overlay sheet surrounding the end board and edge bar.

14. The motor-vehicle cargo-space cover defined in claim 12 wherein the edge bar is formed with a rearwardly open groove in which the end-board front edge is seated, the overlay sheet engaging rearward around the end board and pressing it forward into the groove.

15. The motor-vehicle cargo-space cover defined in claim 1 wherein the end-board front edge is provided with gripper clips engaged around the edge bar and constituting the securing means.

* * * * *